(12) United States Patent
Shimoda et al.

(10) Patent No.: US 12,201,946 B2
(45) Date of Patent: Jan. 21, 2025

(54) FLUID SEPARATION ELEMENT

(71) Applicant: Toray Industries, Inc., Tokyo (JP)

(72) Inventors: Shinya Shimoda, Ehime (JP); Masaaki Takenaka, Ehime (JP); Akira Katayama, Ehime (JP)

(73) Assignee: TORAY INDUSTRIES, INC., Tokyo (JP)

( * ) Notice: Subject to any disclaimer, the term of this patent is extended or adjusted under 35 U.S.C. 154(b) by 147 days.

(21) Appl. No.: 17/278,858

(22) PCT Filed: Sep. 25, 2019

(86) PCT No.: PCT/JP2019/037721
§ 371 (c)(1),
(2) Date: Mar. 23, 2021

(87) PCT Pub. No.: WO2020/067223
PCT Pub. Date: Apr. 2, 2020

(65) Prior Publication Data
US 2022/0032236 A1     Feb. 3, 2022

(30) Foreign Application Priority Data

Sep. 26, 2018 (JP) .................. 2018-180208

(51) Int. Cl.
*B01D 63/10* (2006.01)
*B01D 61/08* (2006.01)
(Continued)

(52) U.S. Cl.
CPC ........... *B01D 63/107* (2022.08); *B01D 61/08* (2013.01); *B01D 61/18* (2013.01); *B01D 63/101* (2022.08);
(Continued)

(58) Field of Classification Search
CPC ........ B01D 61/08; B01D 61/18; B01D 63/10; B01D 63/106; B01D 2201/30; B01D 2201/34; C02F 1/44; C02F 1/441
See application file for complete search history.

(56) References Cited

U.S. PATENT DOCUMENTS

2014/0183126 A1   7/2014   Chikura et al.
2021/0101118 A1   4/2021   Shimoda et al.

FOREIGN PATENT DOCUMENTS

CN    104741005 A    7/2015
CN    204619762 U    9/2015
(Continued)

OTHER PUBLICATIONS

International Search Report and Written Opinion for International Application No. PCT/JP2019/037721, dated Oct. 21, 2019, 4 pages.
(Continued)

*Primary Examiner* — Jonathan M Peo
(74) *Attorney, Agent, or Firm* — BUCHANAN INGERSOLL & ROONEY PC (57) ABSTRACT

A fluid separation element including: a wound body in which a separation membrane is wound around a central pipe; and an anti-telescoping plate, in which the anti-telescoping plate has an opening part that penetrates through the anti-telescoping plate, the central pipe is inserted into the opening part, a depression is formed in at least one of a surface, in the opening part, of the anti-telescoping plate and an outer surface of a portion, inserted into the opening part, of the central pipe, and a gap between the opening part and the central pipe and the depression are filled with a resin.

5 Claims, 5 Drawing Sheets

(51) Int. Cl.
  *B01D 61/18* (2006.01)
  *C02F 1/44* (2023.01)

(52) U.S. Cl.
  CPC .......... *C02F 1/441* (2013.01); *B01D 2201/30* (2013.01); *B01D 2201/34* (2013.01)

(56) References Cited

FOREIGN PATENT DOCUMENTS

| | | | | |
|---|---|---|---|---|
| CN | 204911256 U | 12/2015 | | |
| EP | 3603775 A1 | 2/2020 | | |
| JP | 2012066184 A | * 4/2012 | ........... | B01D 63/106 |
| JP | 2012152717 A | * 8/2012 | | |
| JP | 2013052388 A | 3/2013 | | |
| WO | 2012039302 A1 | 3/2012 | | |
| WO | WO-2014151695 A2 | * 9/2014 | ........... | B01D 63/106 |
| WO | 2018181411 A1 | 10/2018 | | |

OTHER PUBLICATIONS

Chinese Office Action with Search Report for Chinese Application No. 201980063580.X, dated Mar. 28, 2022, with translation, 14 pages.
Chinese Office Action for Chinese Application No. 201980063580.X, issued Sep. 15, 2022, with translation, 12 pages.
Extended European Search Report for European Application No. 19 865 765.2, dated May 9, 2022, 8 pages.
Saudi Arabia Substantive Examination Report for Application No. 521421532, dated May 2, 2023 with translation, 11 pages.
Chinese Decision of Rejection for Chinese Application No. 201980063580.X, dated Jan. 11, 2023 with translation, 10 pages.
Saudi Arabia Substantive Examination Report for Application No. 521421532, dated Sep. 19, 2023 with translation, 11 pages.
Office Action (Notice of Preliminary Rejection) issued Feb. 7, 2024 by the Korean Intellectual Property Office in corresponding Korean Patent Application No. 10-2021-7008878 and an English translation of the Office Action. (9 pages).

* cited by examiner

FLUID SEPARATION ELEMENT

CROSS REFERENCE TO RELATED APPLICATIONS

This is the U.S. National Phase application of PCT/JP2019/037721, filed Sep. 25, 2019, which claims priority to Japanese Patent Application No. 2018-180208, filed Sep. 26, 2018, the disclosures of each of these applications being incorporated herein by reference in their entireties for all purposes.

FIELD OF THE INVENTION

The present invention relates to a fluid separation element.

BACKGROUND OF THE INVENTION

In recent years, usage of a fluid separation element including a separation membrane has been increased rapidly in various water processing fields such as seawater or brackish water desalination and wastewater purification.

An example of a form of fluid separation elements is a spiral type fluid separation element. The spiral type fluid separation element is characterized in including a wound body in which a separation membrane is wound spirally around a central pipe. An end portion of the wound body is ordinarily provided with an anti-telescoping plate to prevent reduction of the separation performance due to deformation of members such as the separation membrane, what is called telescoping. Furthermore, in many cases, the anti-telescoping plate has an opening part and the central pipe is inserted through the anti-telescoping plate in such a manner as to penetrate through the opening part.

In the fluid separation element having such a form, it is probable that the anti-telescoping plate slides in a direction perpendicular to the longitudinal direction of the central pipe, that is, the anti-telescoping plate rotates about the central pipe. If such rotation occurs during a fluid separation process using the fluid separation element, various adverse effects such as a deviation in a stacking of separation membranes wound around the central pipe or damaging of a surface of the separation membrane may occur.

A technique for preventing such rotation in which the anti-telescoping plate and the central pipe are provided with projections and recesses complementary to each other (refer to Patent literature 1, for example) is known.

PATENT LITERATURE

Patent literature 1: Chinese Utility Model No. 204619762.

SUMMARY OF THE INVENTION

However, in the conventional technique, even slight molding errors of the complementary projections and recesses may render the function of preventing rotation of the anti-telescoping plate with respect to the central pipe insufficient. Furthermore, in a manufacturing process of the fluid separation element, it is necessary to fit the anti-telescoping plate to the central pipe while conducting positioning between the complementary projections and recesses. This operation has been considered to be problematic because it is very complex.

An object of the present invention is therefore to provide a fluid separation element in which relative rotation between an anti-telescoping plate and a central pipe is prevented effectively by a simple means.

To solve the above problems, the present invention according to exemplary embodiments includes any of the following configurations (1) to (3):

(1) A fluid separation element including:
a wound body in which a separation membrane is wound around a central pipe; and
an anti-telescoping plate,
in which the anti-telescoping plate has an opening part that penetrates through the anti-telescoping plate,
the central pipe is inserted into the opening part,
a depression is formed in at least one of a surface, in the opening part, of the anti-telescoping plate and an outer surface of a portion, inserted into the opening part, of the central pipe, and
a gap between the opening part and the central pipe and the depression are filled with a resin.

(2) The fluid separation element according to item (1), in which a length $L_1$ of the opening part in a longitudinal direction of the central pipe and a length $L_2$ of the depression in the longitudinal direction of the central pipe satisfy a relation of $L_2 < L_1$.

(3) The fluid separation element according to item (2), in which a sectional shape or a position of the depression in a cross section taken by a plane including a center axis of the central pipe varies in a circumferential direction of the central pipe or the depression has a portion that is non-continuous in the circumferential direction.

The present invention makes it possible to prevent, effectively in a simple manner, relative rotation between an anti-telescoping plate of a fluid separation element and a central pipe that penetrates through the anti-telescoping plate.

DETAILED DESCRIPTION OF EMBODIMENTS OF THE INVENTION

Fluid separation elements according to embodiments of the present invention will be hereinafter described with reference to the drawings etc.

The fluid separation element according to embodiments of the present invention includes a wound body in which a separation membrane is wound around a central pipe and an anti-telescoping plate.

Figure 1:
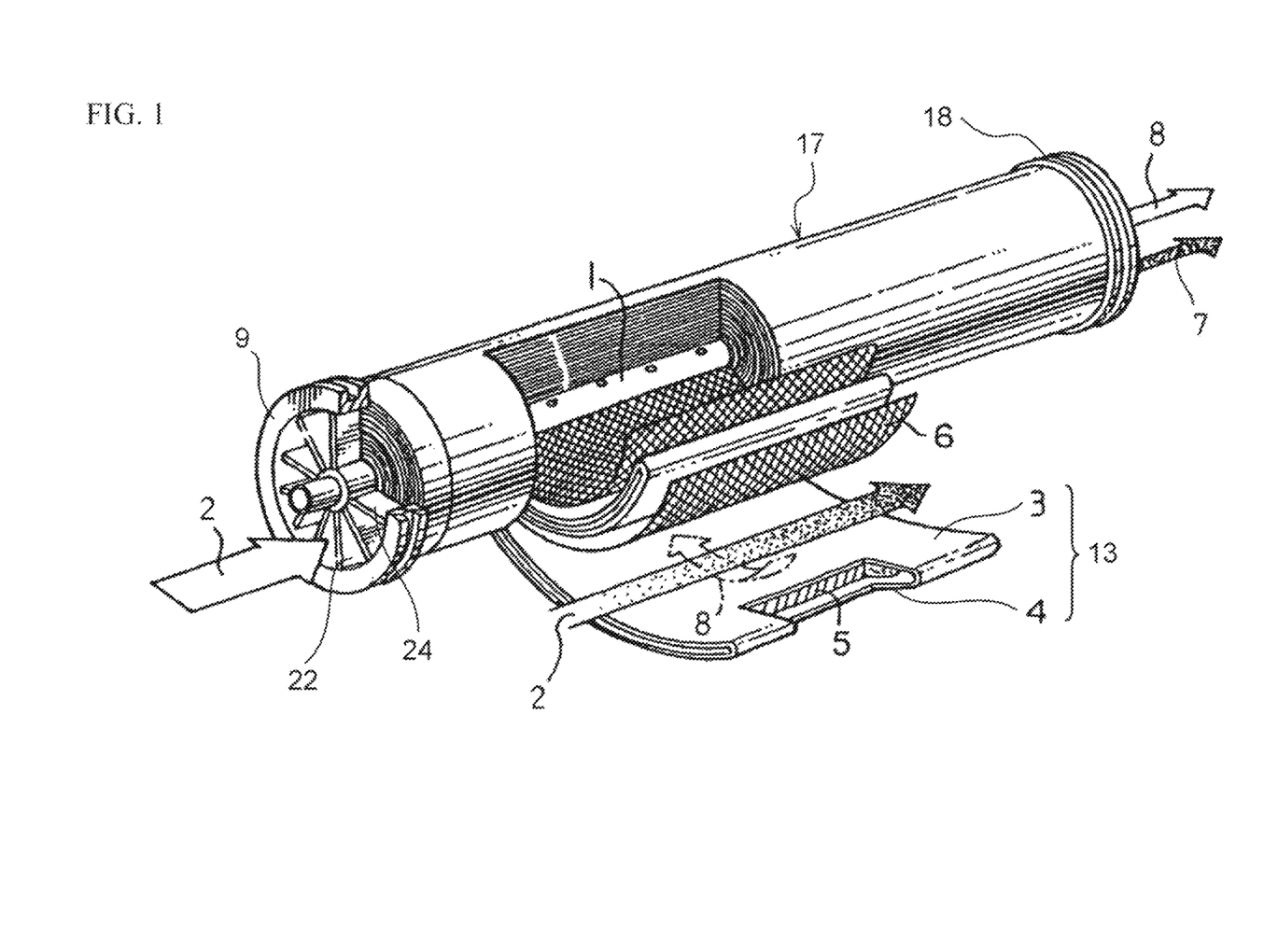
FIG. 1 is a schematic partially-developed view showing an example of the spiral type fluid separation element according to embodiments of the present invention.

FIG. 1 is a schematic partially-developed view showing an example of a spiral type fluid separation element according to embodiments of the present invention. As shown in FIG. 1, the fluid separation element includes a central pipe 1, a first separation membrane 3, a second separation membrane 4, a permeate fluid channel material 5, a feed fluid channel material 6, and anti-telescoping plates 9 and 18.

The first separation membrane 3 and the second separation membrane 4 are bonded to each other at three sides other than the one side that is located on the side of the central pipe 1 and thereby forming an envelope-shaped separation membrane 13. The envelope-shaped separation membrane 13 is wound spirally around the central pipe 1 to form a wound body 17.

In the example shown in FIG. 1, the feed fluid channel material 6 is disposed so as to be opposed to a feed-side surface of the envelope-shaped separation membrane 13, and is wound around the central pipe 1 together with the envelope-shaped separation membrane 13. For example, a net is preferably used as the feed fluid channel material 6.

In the example shown in FIG. 1, a permeate fluid channel material 5 is inserted in the envelope-shaped separation membrane 13 so as to be sandwiched between the first separation membrane 3 and the second separation membrane 4 and is wound around the central pipe 1 together with the envelope-shaped separation membrane 13. For example, a tricot or a projections-fixed sheet can be used as the permeate fluid channel material 5.

The central pipe 1 is a hollow tubular member having plural holes on its side wall.

Figure 2:
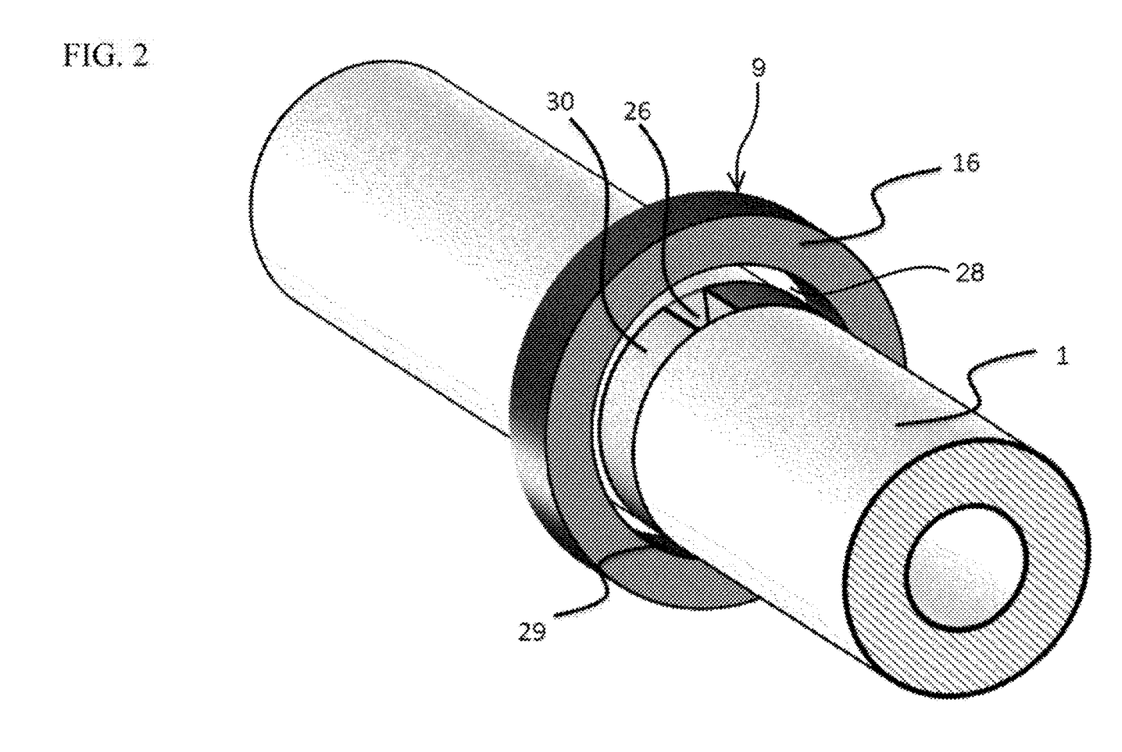
FIG. 2 is a partial schematic perspective view showing a part of a central pipe that is inserted into an opening part of an anti-telescoping plate which is a constituent element of embodiments of the present invention.
Figure 3A:
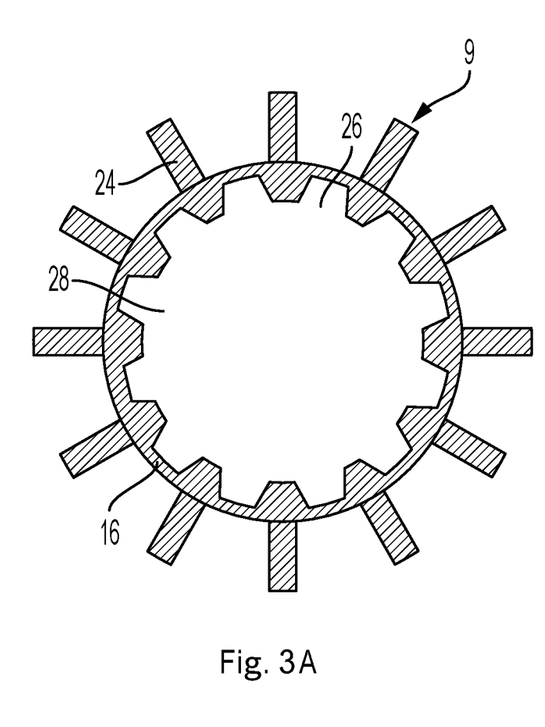
FIG. 3A is a schematic sectional view of the anti-telescoping plate showing the opening part.

An anti-telescoping plate 9 is attached to one, located on the feed fluid 2 inflow side, of the two ends of the wound body 17. The anti-telescoping plate 9 is a disc-shaped member having plural feed inlets 22. In the fluid element shown in FIG. 1, the anti-telescoping plate 9 is configured in such a manner that an outer ring-shaped member and an inner ring-shaped member are connected to each other by spoke-shaped members 24 to form the plural feed inlets 22. The anti-telescoping plate 9 is disposed at one end of the wound body 17. As shown in FIG. 2 and FIG. 3A, an opening part 28 that penetrates through the anti-telescoping plate 9 is formed approximately at the center of the anti-telescoping plate 9 and the central pipe 1 is inserted into the opening part 28.

The other anti-telescoping plate 18, which is a disc-shaped member having a concentrate fluid outlet and a permeate fluid outlet, is disposed at the other end of the wound body 17 which is provided with the anti-telescoping plate 9.

A description will be made of separation of a feed fluid by the fluid separation element shown in FIG. 1. A feed fluid 2 is fed to the wound body 17 through the plural feed inlets 22 of the anti-telescoping plate 9. The feed fluid 2 moves, on the feed-side surface of the envelope-shaped separation membrane 13, in the feed fluid channel formed by the feed fluid channel material 6. A fluid (indicated as a permeate fluid 8 in FIG. 1) that has permeated through the envelope-shaped separation membrane 13 moves in the permeate fluid channel formed by the permeate fluid channel material 5. The permeate fluid 8 that has reached the central pipe 1 through an opening part of the envelope-shaped separation membrane 13 enters the inside of the central pipe 1 through the holes of the central pipe 1. The permeate fluid 8 that has flown through the inside of the central pipe 1 is drained to the outside through the anti-telescoping plate 18 which is located at the other end. On the other hand, a fluid (indicated as concentrate fluid 7 in FIG. 1) that has not permeated through the envelope-shaped separation membrane 13 moves in the feed fluid channel and is drained to the outside through the anti-telescoping plate 18 which is located at the other end. In this manner, the feed fluid 2 is separated into the permeate fluid 8 and the concentrate fluid 7.

To protect the wound body 17, it is preferable that the outer circumferential part of the wound body 17 is covered with an outer shell. It is preferable that the outer shell is made of fiber-reinforced plastic (FRP) of a mixture of fibers and a resin. Examples of a material of the fibers contained in the fiber-reinforced plastic include glass, basalt, nylon, and polyethylene. Among them, glass is preferable to make strength of the outer shell sufficient and make it possible to see the inside of the outer shell. Examples of the resin of a component of the fiber-reinforced plastic include polyethylene, polypropylene, and epoxy resin. Among them, epoxy resin is preferable to make strength of the outer shell sufficient.

Examples of the material of the perforated central pipe constituting the wound body of the fluid separation element according to embodiments of the present invention include a resin and a metal, but a resin such as Noryl resin, modified polyphenylene ether-based resin, or ABS resin is preferable because it is excellent in terms of cost and durability.

Examples of the separation membranes constituting the wound body of the fluid separation element according to embodiments of the present invention include a reverse osmosis membrane, an ultrafiltration membrane, and a microfiltration membrane.

Examples of the material of the anti-telescoping plates of the fluid separation element according to embodiments of the present invention include a thermoplastic resin, a thermosetting resin, and a heat-resistant resin. A resin such as ABS resin is preferable because it is excellent in terms of cost and durability. As for the shape of the anti-telescoping plates, to feed a feed fluid into the separation membrane element with high efficiency while maintaining strength, a spoke-type structure is preferable in which an outer ring-shaped member and an inner ring-shaped member are connected to each other by plural spoke-shaped members.

It is necessary that the anti-telescoping plate of the fluid separation element according to embodiments of the present invention has an opening part that penetrates through the anti-telescoping plate, the above-mentioned central pipe is inserted into the opening part, and a depression is formed in at least one of a surface, in the opening part, of the anti-telescoping plate and an outer surface of a portion, inserted into the opening part, of the central pipe.

FIG. 2 is a partial schematic perspective view showing a part in which the central pipe constituting the wound body of the fluid separation element according to embodiments of the present invention is inserted into the opening part of the anti-telescoping plate of the fluid separation element according to embodiments of the present invention. The anti-telescoping plate 9 has, approximately at its center, an opening part 28 which penetrates through the anti-telescoping plate 9 and the central pipe 1 is inserted into the opening part 28.

The phrase "a surface, in the opening part, of the anti-telescoping plate" means, in the surfaces of the anti-telescoping plate constituting the opening part, a portion which cannot be seen when the anti-telescoping plate is viewed in the longitudinal direction of the central pipe.

The phrase "an outer surface of a portion, inserted into the opening part, of the central pipe" means, in the surface of the central pipe, a portion which cannot be seen when the anti-telescoping plate and the central pipe are viewed in the longitudinal direction of the central pipe. In FIG. 2, this portion is an outer surface 30 of the portion inserted into the opening part 28.

As described above, in the fluid separation element according to embodiments of the present invention, it is necessary that a depression is formed in at least one of "a surface, in the opening part, of the anti-telescoping plate" and "an outer surface of a portion, inserted into the opening part, of the central pipe". In FIG. 2, the depression is formed in only the outer surface side of the central pipe, and is indicated as depression 26.

In the fluid separation element according to embodiments of the present invention, it is necessary that a resin fills the gap between the opening part and the central pipe and the depression. When the resin fills both of the gap and the depression and then is cured, the cured resin serves as a member for fixing the central pipe and the anti-telescoping plate, that is, plays the role of an anchor, whereby relative rotation between the anti-telescoping plate and the central pipe penetrating through it can be suppressed. To maintain sufficient strength of the cured resin, it is preferable that the resin filled thereinto is epoxy resin or urethane resin. In this case, a fitting member that is formed so as to fit in a gap between the central pipe and the anti-telescoping plate and the depression may be inserted in the gap between the central pipe and the anti-telescoping plate and a resin may fill the gap between the fitting member and the central pipe and the gap between the fitting member and the anti-telescoping plate.

It is preferable that the length $L_1$ of the opening part in the longitudinal direction of the central pipe 1 and the length $L_2$ of the depression in the longitudinal direction of the central pipe 1 satisfy a relation of $L_2 < L_1$. When $L_1$ and $L_2$ satisfy this relation, the charged resin 27 can be prevented from sticking out from the opening part.

Figure 3B:
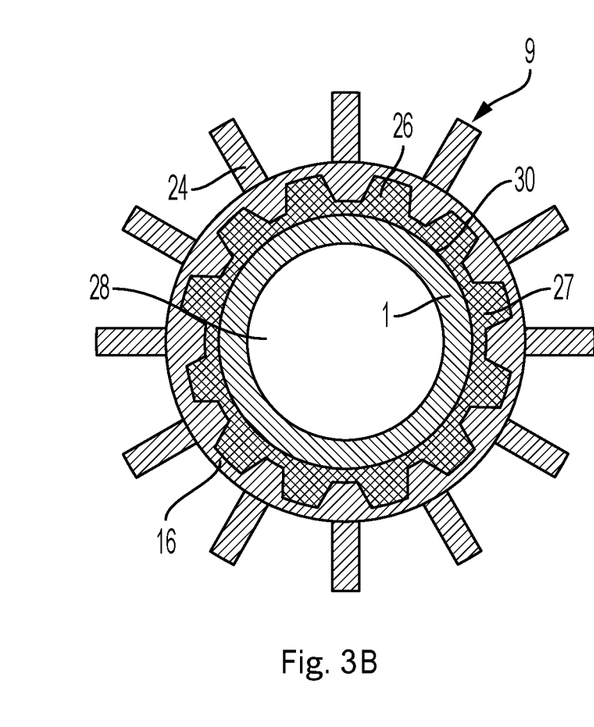
FIG. 3B is a schematic sectional view taken perpendicularly to the longitudinal direction of the central pipe at a position where the anti-telescoping plate and the central pipe are fixed to each other in a fluid separation element according to one embodiment of the present invention.
Figure 4:
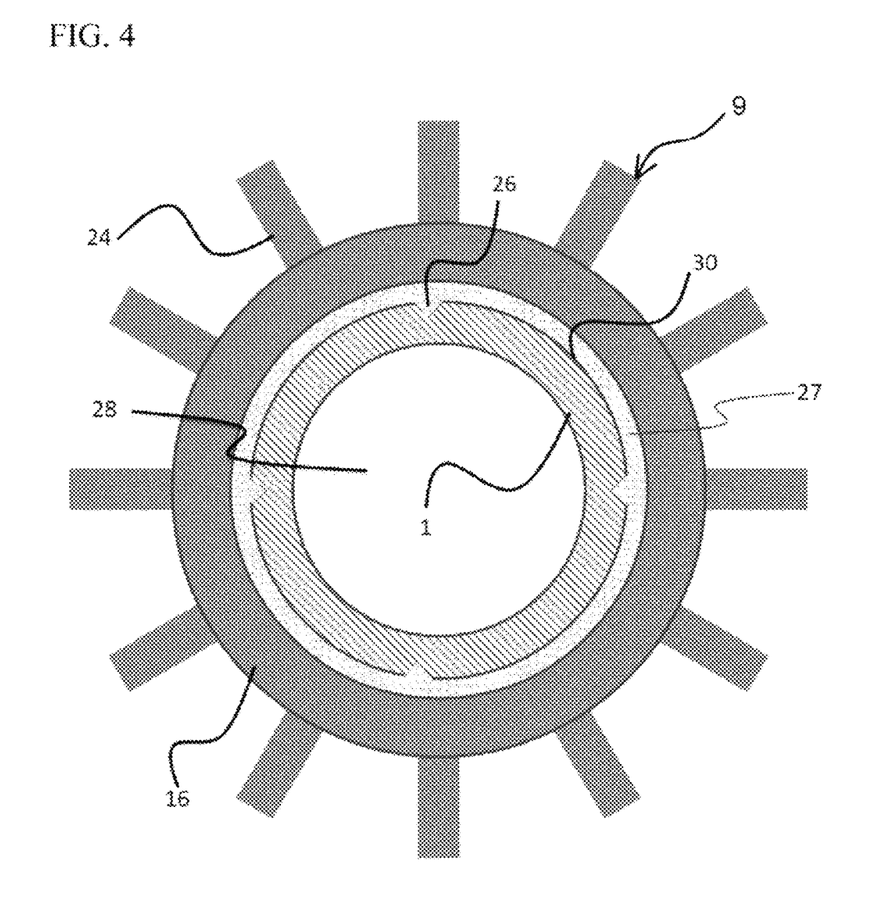
FIG. 4 is a schematic sectional view taken perpendicularly to the longitudinal direction of the central pipe at a position where the anti-telescoping plate and the central pipe are fixed to each other in a fluid separation element according to another embodiment of the present invention.
Figure 5:
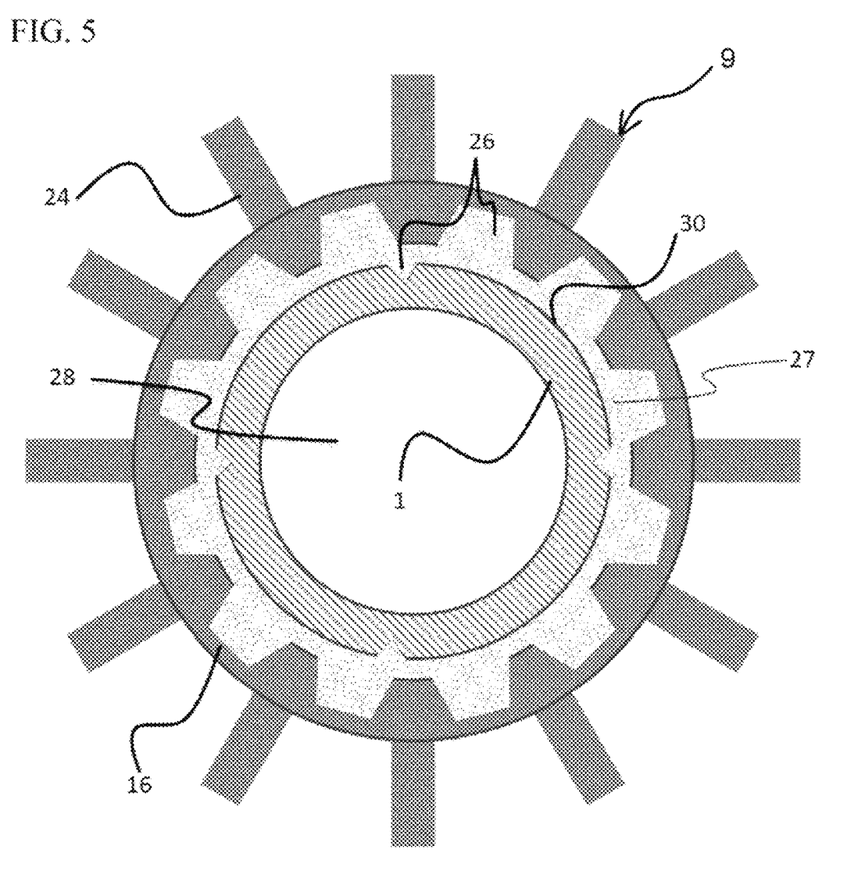
FIG. 5 is a schematic sectional view taken perpendicularly to the longitudinal direction of the central pipe at a position where the anti-telescoping plate and the central pipe are fixed to each other in a fluid separation element according to another embodiment of the present invention.

Each of FIGS. 3B and 4-5 is a schematic sectional view taken perpendicularly to the longitudinal direction of the central pipe at the position where the anti-telescoping plate and the central pipe are fixed to each other in the fluid separation element according to an embodiment of the present invention. In FIG. 3B, depressions 26 are formed only in the anti-telescoping plate 9 and a resin 27 fills the gap between the opening part 28 of the anti-telescoping plate 9 and the central pipe 1 inserted into the opening part 28 and the depressions 26. In FIG. 4, depressions 26 are formed only in the outer surface 30 of a portion, inserted into the opening part 28 of the anti-telescoping plate 9, of the outer surface of the central pipe 1. In FIG. 5, depressions 26 are formed both in the anti-telescoping plate 9 and in the outer surface 30 of a portion, inserted into the opening part 28 of the anti-telescoping plate 9, of the outer surface of the central pipe 1. In each of FIGS. 4 and 5, a resin 27 fills the gap between the opening part 28 of the anti-telescoping plate 9 and the central pipe 1 inserted into the opening part 28 and the depressions 26.

It is preferable that the depression has a shape of a triangular prism, a cylinder, a semi-sphere, an arc, or the like. However, this description does not restrict the shape thereof.

It is preferable that the depth of the depression is within a degree of not penetrating through the anti-telescoping plate or central pipe formed with the depression to prevent leakage of the resin filling the depression.

In the fluid separation element according to the present invention, it is preferable that the sectional shape or position of the depression in a cross section taken by a plane including the center axis of the central pipe vary in the circumferential direction of the central pipe or the depression has a portion that is non-continuous in the circumferential direction. When the sectional shape or position of the depression varies in the circumferential direction of the central pipe or the depression has a portion that is non-continuous in the circumferential direction, relative rotation between the anti-telescoping plate and the central pipe can be suppressed more certainly.

For preventing the amount of resin for filling from becoming too large while sufficiently suppressing relative rotation between the anti-telescoping plate and the central pipe, it is preferable that the ratio of the entire volume of the depressions to the volume of the opening part of the anti-telescoping plate is 0.1% to 1% (0.1% to 1.4% in the case where more accurate expressions are made by equalizing significant digits of the numbers).

Although the structure at the one end of the fluid separation element, that is, the structure of the anti-telescoping plate 9 and the central pipe 1 has been described above, a depression may be formed in at least one of the inner surface of the opening part of the anti-telescoping plate 18 and the outer surface, opposed to the inner surface of the opening part, of the central pipe also at the other end of the fluid separation element. In the present invention, at least at one end of the fluid separation element, the fluid separation element has a configuration in which the depression is formed in at least one of the anti-telescoping plate and the central pipe. And it is more preferable that the fluid separation element has such a configuration at both ends. When the fluid separation element has a configuration in which the depression is formed in at least one of the inner surface of the opening part of the anti-telescoping plate and the outer surface, opposed to the inner surface of the opening part, of the central pipe at both ends of the fluid separation element, rotation of the anti-telescoping plate can be suppressed more certainly.

If necessary, the fluid separation element according to the present invention may be housed in a pressure vessel to be used. In this case, for example, by sealing a gap between the anti-telescoping plate of the fluid separation element and the pressure vessel using a brine seal, simplistic flow of feed fluid into the gap can be prevented. Examples of such a brine seal include a known U-coupling seal, V-coupling seal, O-ring seal, and split ring seal. Among them, the U-coupling seal which can be loaded easily is preferable. A preferable material of the brine seal is an elastic material which can be loaded easily. Examples of the elastic material include various kinds of rubber such as nitrile rubber, styrol rubber, silicone rubber, fluororubber, acrylic rubber, ethylene-propylene rubber, ethylene-propylene-diene rubber, and urethane rubber. Among these kinds of rubbers, for further increasing elasticity and strength of rubber which are elastic material, ethylene-propylene rubber or ethylene-propylene-diene rubber is preferable, and ethylene-propylene-diene rubber in which crosslinking structure thereof includes a peroxide structure is more preferable.

EXAMPLES

Although the present invention will be described in more detail using specific Examples, the present invention should not be restricted by these Examples.

Example 1

A common spiral type fluid separation element having a form as shown in FIG. 1 was manufactured.

An envelope-shaped separation membrane was formed by cutting a polyamide-based reverse osmosis membrane into a membrane of 1,070 mm in width and 1,670 mm in length, stacking two membranes each obtained by folding one of the above membranes in half in the longitudinal direction such that the surfaces on the side of a reverse osmosis membrane functional layer were located inside, and bonding contact surfaces of a first separation membrane of the upper side and a second separation membrane of the underside to each other along three sides other than one side contacting with the central pipe using a polyurethane-based resin. A separation membrane unit was prepared by inserting a permeate fluid channel material that was a tricot sheet into the envelope-shaped separation membrane so as to be interposed between the separation membranes of the envelope-shaped separation membrane and placing a feed fluid channel material that was a net on the functional-layer-side surface of the envelope-shaped separation membrane.

A wound body was formed by stacking the thus-prepared separation membrane units and winding them around a central pipe (outer diameter: 38 mm; length: 1,016 mm) made of a modified polyphenylene ether-based resin.

The thus-formed wound body was edge-cut at both ends and anti-telescoping plates made of ABS resin were respectively disposed at the both ends. As each anti-telescoping plate, one having a spoke-type structure in which an outer ring-shaped member having an outer diameter of 200 mm and an inner ring-shaped member having an inner diameter of 38 mm were connected to each other by 12 spoke-shaped members, in which the entire circumferential edge, on the side of contact to the wound body, of the opening part had a taper having an angle of 45° and a depth of 3 mm was used.

A total of 12 triangular-prism-shaped depressions were formed at equal intervals in the tapered surface (a surface of the anti-telescoping plate in the opening part). The total volume of the 12 depressions was 324 mm$^3$ which accounted for 1% of the volume of the opening part of the anti-telescoping plate.

The gap between the opening part of the anti-telescoping plate and the central pipe and the 12 depressions were filled with resin.

An FRP shell was formed by covering the outer circumferential surface of the wound body with fiber-reinforced plastic (FRP) that was a mixture of glass fibers and epoxy resin, whereby a fluid separation element was prepared.

A test fluid obtained by adding iron (III) chloride and polyacrylamide as coagulants to 2,000 ppm suspension water of flour was fed to the fluid separation element that was housed in a pressure vessel and then the fluid separation element was operated at a pressure of 0.5 MPa for seven days in total, five hours per day.

The rotation angle of each anti-telescoping plate with respect to the central pipe after the operation of seven days was 0°.

Example 2

A common spiral type fluid separation element having a form as shown in FIG. 1 was manufactured.

An envelope-shaped separation membrane was formed by cutting a polyamide-based reverse osmosis membrane into a membrane of 1,070 mm in width and 1,670 mm in length, stacking two membranes each obtained by folding one of the above membranes in half in the longitudinal direction such that the surfaces on the side of a reverse osmosis membrane functional layer were located inside, and bonding contact surfaces of a first separation membrane of the upper side and a second separation membrane of the underside to each other along three sides other than one side contacting with the central pipe using a polyurethane-based resin. A separation membrane unit was prepared by inserting a permeate fluid channel material that was a tricot sheet into the envelope-shaped separation membrane so as to be interposed between the separation membranes of the envelope-shaped separation membrane and placing a feed fluid channel material that was a net on the functional-layer-side surface of the envelope-shaped separation membrane.

A wound body was formed by stacking the thus-prepared separation membrane units and winding them around a central pipe (outer diameter: 38 mm; length: 1,016 mm) made of a modified polyphenylene ether-based resin.

The thus-formed wound body was edge-cut at both ends and anti-telescoping plates made of ABS resin were disposed respectively at the both ends. Each anti-telescoping plate used had a spoke-type structure in which an outer ring-shaped member having an outer diameter of 200 mm and an inner ring-shaped member having an inner diameter of 38 mm were connected to each other by 12 spoke-shaped members and the entire circumferential edge, on the side of contact to the wound body, of the opening part had a taper having an angle of 45° and a depth of 3 mm.

A total of 12 cylindrical depressions were formed at equal intervals in the circumferential direction of the central pipe in the outer surface of a portion, inserted into the opening part, of the central pipe. The total volume of the 12 depressions was 324 mm$^3$ which accounted for 1% of the volume of the opening part of the anti-telescoping plate.

The gap between the opening part of the anti-telescoping plate and the central pipe and the 12 depressions were filled with resin.

An FRP shell was formed by covering the outer circumferential surface of the wound body with fiber-reinforced plastic (FRP) that was a mixture of glass fibers and epoxy resin, whereby a fluid separation element was prepared.

A test fluid obtained by adding iron (III) chloride and polyacrylamide as coagulants to 2,000 ppm suspension water of flour was fed to the fluid separation element that was housed in a pressure vessel and then the fluid separation element was operated at a pressure of 0.5 MPa for seven days in total, five hours per day.

The rotation angle of each anti-telescoping plate with respect to the central pipe after the operation of seven days was 0°.

Example 3

A common spiral type fluid separation element having a form as shown in FIG. 1 was manufactured.

An envelope-shaped separation membrane was formed by cutting a polyamide-based reverse osmosis membrane into a membrane of 1,070 mm in width and 1,670 mm in length, stacking two membranes each obtained by folding one of the above membranes in half in the longitudinal direction such that the surfaces on the side of a reverse osmosis membrane functional layer were located inside, and bonding contact surfaces of a first separation membrane of the upper side and a second separation membrane of the underside to each other along three sides other than one side contacting with the central pipe using a polyurethane-based resin. A separation membrane unit was prepared by inserting a permeate fluid channel material that was a tricot sheet into the envelope-shaped separation membrane so as to be interposed between the separation membranes of the envelope-shaped separation membrane and placing a feed fluid channel material that was a net on the functional-layer-side surface of the envelope-shaped separation membrane.

A wound body was formed by stacking the thus-prepared separation membrane units and winding them around a central pipe (outer diameter: 38 mm; length: 1,016 mm) made of a modified polyphenylene ether-based resin.

The thus-formed wound body was edge-cut at both ends and anti-telescoping plates made of ABS resin were disposed respectively at the both ends. Each anti-telescoping plate used had a spoke-type structure in which an outer ring-shaped member having an outer diameter of 200 mm and an inner ring-shaped member having an inner diameter of 38 mm were connected to each other by 12 spoke-shaped members and the entire circumferential edge, on the side of contact to the wound body, of the opening part had a taper having an angle of 45° and a depth of 3 mm.

A total of 12 triangular-prism-shaped depressions were formed at equal intervals in the tapered surface (a surface of the anti-telescoping plate in the opening part).

Furthermore, a total of 12 cylindrical depressions were formed in the outer surface of a portion, inserted into the opening part, of the central pipe at equal intervals in the circumferential direction of the central pipe. The total volume of the 24 depressions was 324 mm³ which accounted for 1% of the volume of the opening part of the anti-telescoping plate.

The gap between the opening part of each anti-telescoping plate and the central pipe and the 24 depressions were filled with resin.

An FRP shell was formed by covering the outer circumferential surface of the wound body with fiber-reinforced plastic (FRP) that was a mixture of glass fibers and epoxy resin, whereby a fluid separation element was prepared.

A test fluid obtained by adding iron (III) chloride and polyacrylamide as coagulants to 2,000 ppm suspension water of flour was fed to the fluid separation element that was housed in a pressure vessel and then the fluid separation element was operated at a pressure of 0.5 MPa for seven days in total, five hours per day.

The rotation angle of each anti-telescoping plate with respect to the central pipe after the operation of seven days was 0°.

Comparative Example 1

A fluid separation element was manufactured in the same manner as in Example 1 except that no depressions were formed in each anti-telescoping plate, and then it was operated for seven days in total in the same manner.

The rotation angle of each anti-telescoping plate with respect to the central pipe after the operation of seven days was 3°.

Although the present invention has been described in detail with reference to the particular embodiments, it is apparent to those skilled in the art that various changes and modifications can be made without departing from the spirit and scope of the present invention. The present application is based on Japanese Patent Application No. 2018-180208 filed on Sep. 26, 2018, the disclosure of which is incorporated herein by reference.

DESCRIPTION OF SYMBOLS

1: Central pipe
2: Feed fluid
3: First separation membrane
4: Second separation membrane
5: Permeate fluid channel material
6: Feed fluid channel material
7: Concentrate fluid
8: Permeate fluid
9: Anti-telescoping plate
13: Envelope-shaped separation membrane
16: Inner ring-shaped member
17: Wound body
18: The other anti-telescoping plate
22: Feed inlet
24: Spoke-shaped member
26: Depression
27: Resin
28: Opening part
29: Surface of anti-telescoping plate in opening part
30: Outer surface of a portion inserted into opening part

The invention claimed is:

1. A fluid separation element comprising:
a wound body in which a separation membrane is wound around a central pipe; and
an anti-telescoping plate,
wherein the anti-telescoping plate has an opening part that penetrates through the anti-telescoping plate,
the central pipe is inserted into the opening part,
a depression is formed in at least one of (i) a surface, in the opening part, of the anti-telescoping plate and (ii) an outer surface of a portion of the central pipe, located within the opening part of the anti-telescoping plate,
both the depression and a gap between the opening part and the central pipe are filled with a resin, wherein the resin is configured to fix the central pipe and the anti-telescoping plate, to thereby suppress relative rotation between the anti-telescoping plate and the central pipe, and
at least at one of two ends of the fluid separation element, the fluid separation element has a configuration in which the depression is formed in at least one of the anti-telescoping plate and the central pipe,
wherein a depth of the depression in a direction perpendicular to a longitudinal direction of the central pipe is shorter than a thickness in the direction perpendicular to the longitudinal direction of the central pipe of the anti-telescoping plate or the central pipe formed with the depression.

2. The fluid separation element according to claim 1, wherein a length L1 of the opening part in the longitudinal direction of the central pipe and a length L2 of the depression in the longitudinal direction of the central pipe satisfy a relation of L2<L1.

3. The fluid separation element according to claim 2, wherein a sectional shape or a position of the depression in a cross section taken by a plane including a center axis of the central pipe varies in a circumferential direction of the central pipe or the depression has a portion that is non-continuous in the circumferential direction.

4. The fluid separation element according to claim 3, wherein both ends of the fluid separation element has the depression formed in at least one of an inner surface of the opening part of the anti-telescoping plate, and the outer surface of the portion of the central pipe, opposed to the inner surface of the opening part, of the central pipe.

5. The fluid separation element according to claim 1, wherein a ratio of an entire volume of the depression to a volume of the opening part of the anti-telescoping plate is 0.1% to 1.4%.

\* \* \* \* \*